US010033801B2

(12) United States Patent
Chapman

(10) Patent No.: US 10,033,801 B2
(45) Date of Patent: Jul. 24, 2018

(54) ASSOCIATIVE SUMMING FOR HIGH PERFORMANCE COMPUTING

(71) Applicant: MELLANOX TECHNOLOGIES LTD., Yokneam (IL)

(72) Inventor: Hillel Chapman, Ramat Hashofet (IL)

(73) Assignee: Mellanox Technologies, Ltd., Yokneam (IL)

( * ) Notice: Subject to any disclaimer, the term of this patent is extended or adjusted under 35 U.S.C. 154(b) by 42 days.

(21) Appl. No.: 15/041,038

(22) Filed: Feb. 11, 2016

(65) Prior Publication Data

US 2016/0239262 A1 Aug. 18, 2016

Related U.S. Application Data

(60) Provisional application No. 62/115,167, filed on Feb. 12, 2015.

(51) Int. Cl.
*G06F 7/00* (2006.01)
*H04L 29/08* (2006.01)
*G06F 7/485* (2006.01)

(52) U.S. Cl.
CPC .............. *H04L 67/10* (2013.01); *G06F 7/485* (2013.01)

(58) Field of Classification Search
CPC .................................. H04L 67/10; G06F 7/485

USPC ......................................................... 708/204
See application file for complete search history.

(56) References Cited

U.S. PATENT DOCUMENTS

| 8,977,669 B2 * | 3/2015 | Chen ...................... G06F 9/3885 708/495 |
| 9,110,860 B2 | 8/2015 | Shahar |
| 2002/0126838 A1 * | 9/2002 | Shimbo ................... G06F 7/723 380/28 |
| 2015/0358219 A1 * | 12/2015 | Kanda ................. H04L 41/0896 709/224 |

* cited by examiner

*Primary Examiner* — Tan V. Mai
(74) *Attorney, Agent, or Firm* — D. Kligler I.P. Services Ltd.

(57) ABSTRACT

Apparatus, systems, and methods are described, including apparatus that includes one or more communication interfaces for communicating over a communication network, and a processor. The processor is configured to receive, via the communication interfaces, a plurality of numbers, and calculate a sum of the numbers that is independent of an order in which the numbers are received, by (i) converting any of the numbers that are received in a floating-point representation to a derived floating-point representation that includes a plurality of signed integer multiplicands corresponding to different respective orders of magnitude, and (ii) summing the numbers in the derived floating-point representation, by separately summing integer multiplicands that correspond to the same order of magnitude. Other embodiments are also described.

20 Claims, 2 Drawing Sheets

US 10,033,801 B2

ASSOCIATIVE SUMMING FOR HIGH PERFORMANCE COMPUTING

CROSS-REFERENCE TO RELATED APPLICATIONS

The present application claims the benefit of U.S. Provisional Application 62/115,167, filed Feb. 12, 2015, whose disclosure is incorporated herein by reference.

FIELD OF THE INVENTION

The present invention relates generally to High Performance Computing (HPC), and specifically to the parallel execution of certain arithmetic operations on an HPC network.

BACKGROUND

In HPC applications, a computational task may be distributed over multiple nodes (or "processes") in a network of computers. Each node performs part of the task, thus generating a partial result. In some cases, the partial results are then combined in some way, e.g., by summing, multiplying, or computing the minimum or maximum of the partial results. For example, the Message Passing Interface (MPI) for HPC defines a "reduction" operation MPI_Reduce, by which partial results are collected and combined, e.g., by being summed.

A computational task performed as described above may be referred to as a parallel computing task, in that the task is divided into multiple subtasks that are performed in parallel.

U.S. Pat. No. 9,110,860, whose disclosure is incorporated herein by reference, describes a computing method that includes accepting a notification of a computing task for execution by a group of compute nodes interconnected by a communication network, which has a given interconnection topology and includes network switching elements. A set of preferred paths, which connect the compute nodes in the group via at least a subset of the network switching elements to one or more root switching elements, are identified in the communication network based on the given interconnection topology and on a criterion derived from the computing task. The network switching elements in the subset are configured to forward node-level results of the computing task produced by the compute nodes in the group to the root switching elements over the preferred paths, so as to cause the root switching elements to calculate and output an end result of the computing task based on the node-level results.

SUMMARY OF THE INVENTION

There is provided, in accordance with some embodiments of the present invention, apparatus that includes one or more communication interfaces for communicating over a communication network, and a processor. The processor is configured to receive, via the communication interfaces, a plurality of numbers. The processor is further configured to calculate a sum of the numbers that is independent of an order in which the numbers are received, by (i) converting any of the numbers that are received in a floating-point representation to a derived floating-point representation that includes a plurality of signed integer multiplicands corresponding to different respective orders of magnitude, and (ii) summing the numbers in the derived floating-point representation, by separately summing integer multiplicands that correspond to the same order of magnitude.

In some embodiments, the apparatus is a network switch, the communication interfaces being ports belonging to the network switch, and the processor being a processor of the network switch.

In some embodiments, the apparatus is a network interface controller (NIC), the communication interfaces being ports belonging to the NIC, and the processor being a processor of the NIC.

In some embodiments, the processor is further configured to:
convert the sum of the numbers from the derived floating-point representation to the floating-point representation, and
subsequently, communicate the sum to one or more nodes on the network.

In some embodiments, the derived floating-point representation includes a sufficient number of bits such as to represent any given number that is received in the floating-point representation without any loss of precision relative to the floating-point representation.

In some embodiments, the communication network includes a High Performance Computing (HPC) network, and the numbers are respective partial results of a parallel computing task performed on the HPC network.

In some embodiments, the derived floating-point representation further includes an integer indicator that indicates a highest order of magnitude of the orders of magnitude.

In some embodiments, the processor is configured to sum a first number and a second number in the derived floating-point representation by:
computing a non-negative difference D between (i) the integer indicator of the first number, and (ii) the integer indicator of the second number,
aligning the second number with the first number, by shifting the integer multiplicands of the second number by D positions, and
subsequently, separately summing each pair of integer multiplicands that are at the same position.

In some embodiments, each of the signed integer multiplicands includes a plurality of B magnitude bits, and a number of integer multiplicands in the derived floating-point representation is a smallest integer N for which $B*(N-1) \geq M-1$, M being a number of mantissa bits in the floating-point representation.

In some embodiments, each of the signed integer multiplicands further includes at least one overflow magnitude bit, and the processor is configured to use the overflow magnitude bit to store any sum of integer multiplicands that is greater than $2^B-1$.

There is further provided, in accordance with some embodiments of the present invention, a system that includes a plurality of networked computers and at least one network switch. The network switch is configured to receive, from the computers, a plurality of numbers. The network switch is further configured to calculate a sum of the numbers that is independent of an order in which the numbers are received, by (i) converting any of the numbers that are received in a floating-point representation to a derived floating-point representation that includes a plurality of signed integer multiplicands corresponding to different respective orders of magnitude, and (ii) summing the numbers in the derived floating-point representation, by separately summing integer multiplicands that correspond to the same order of magnitude.

There is further provided, in accordance with some embodiments of the present invention, a method. Using a network switch, a plurality of numbers are received. Further using the network switch, a sum of the numbers, which is independent of an order in which the numbers are received, is calculated, by (i) converting any of the numbers that are received in a floating-point representation to a derived floating-point representation that includes a plurality of signed integer multiplicands corresponding to different respective orders of magnitude, and (ii) summing the numbers in the derived floating-point representation, by separately summing integer multiplicands that correspond to the same order of magnitude.

There is further provided, in accordance with some embodiments of the present invention, a computer software product including a tangible non-transitory computer-readable medium in which program instructions are stored. The instructions, when read by a processor, cause the processor to receive a plurality of numbers. The instructions further cause the processor to calculate a sum of the numbers that is independent of an order in which the numbers are received, by (i) converting any of the numbers that are received in a floating-point representation to a derived floating-point representation that includes a plurality of signed integer multiplicands corresponding to different respective orders of magnitude, and (ii) summing the numbers in the derived floating-point representation, by separately summing integer multiplicands that correspond to the same order of magnitude.

The present invention will be more fully understood from the following detailed description of embodiments thereof, taken together with the drawings, in which:

DETAILED DESCRIPTION OF EMBODIMENTS

Overview

Figure 1:
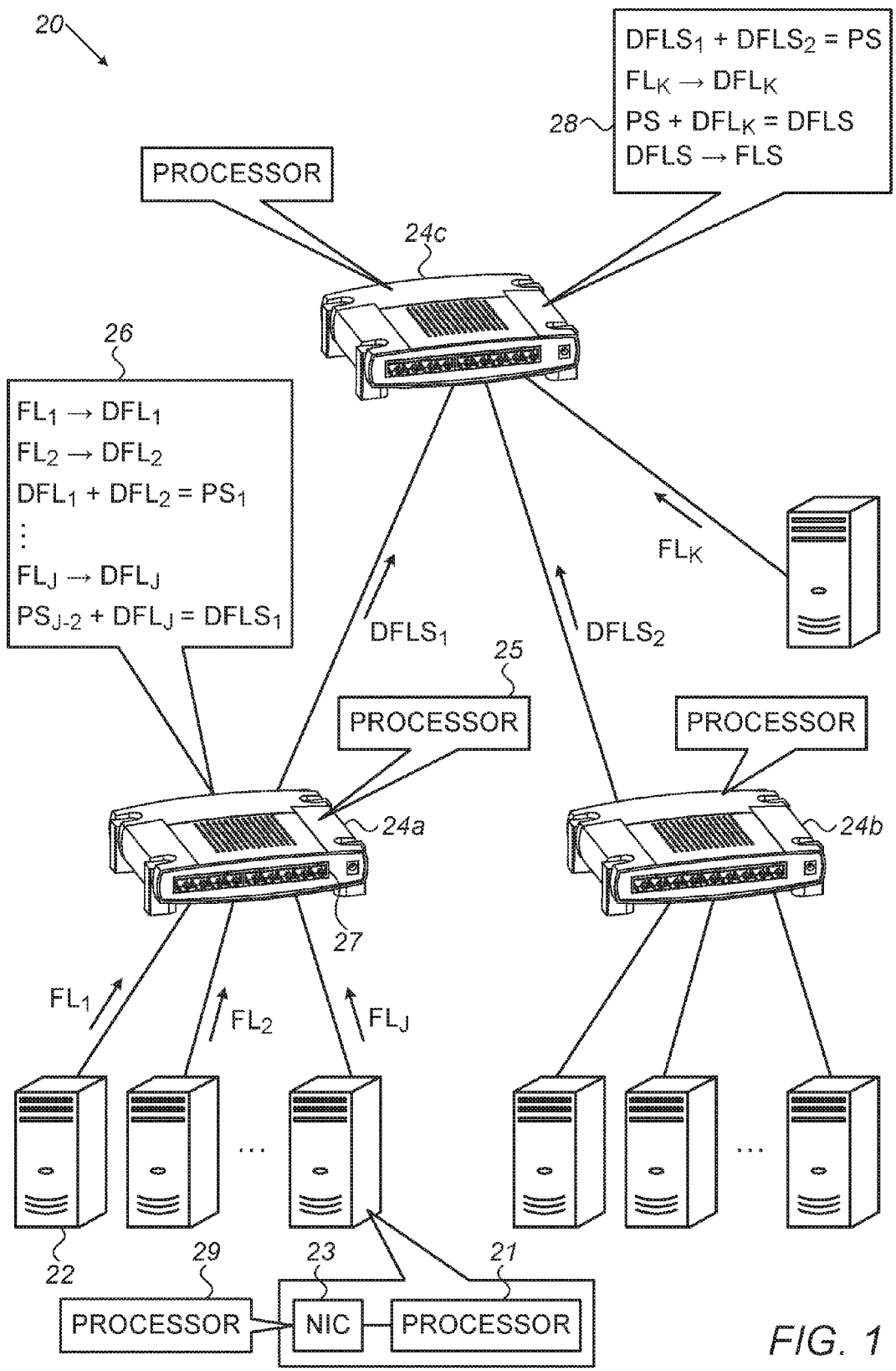
FIG. 1 is a schematic illustration of a High Performance Computing (HPC) network, in accordance with some embodiments of the present invention.

As described above, in a summing reduction operation, a plurality of numbers are summed. In general, in HPC applications, the order of arrival of the numbers will vary from one case to the next, e.g., due to variation in the times at which the numbers are generated, and/or due to various nodes and links in the network having non-constant computational and propagation latencies.

A problem thus arises when the numbers are represented in floating-point representation (or "notation"), since, in such cases, the summing operation is not necessarily associative, i.e., the result of the operation may depend on the order in which the numbers are summed. For example, per the IEEE 754 standard 64-bit-precision floating-point representation, the sum of the numbers 4, $-4$, and $10^{-30}$ depends on the order in which the numbers are summed:

$$(4+-4)+10^{-30}=0+10^{-30}=10^{-30}, \text{ but} \quad \text{(i)}$$

$$4+(-4+10^{-30})=4+-4=0. \quad \text{(ii)}$$

In case (ii), due to the magnitude of $-4$ being much greater than that of $10^{-30}$, the sum of $-4$ and $10^{-30}$ is computed as $-4$, i.e., the number $10^{-30}$ is lost. Although this loss of precision is not necessarily problematic per se, the lack of consistency in floating-point summation is problematic.

One way to achieve greater consistency is to collect all of the floating-point numbers at a single node in the network, and then use the collecting node to sum the numbers in some predefined order, e.g., based on the respective magnitudes of the numbers, or based on an ordering of the other nodes from which the numbers were received. This approach, however, has certain disadvantages. For example, this approach entails storing all of the numbers on the collecting node prior to performing the summation, thus necessitating higher memory overhead on the collecting node. Furthermore, network switches en route to the collecting node may need to receive, and forward on, many numbers, thus consuming greater bandwidth and increasing the overall latency of the task. Moreover, this approach does not necessarily allow for changes in the network topology.

Embodiments of the present invention provide a superior solution to the above problem, by providing an HPC system that is configured to associatively add floating-point numbers without unduly increasing the memory overhead, consumed bandwidth, or latency, and without prohibiting changes in the network topology. The system comprises a plurality of compute nodes, which are networked with each other via one or more network switches. Computational tasks are distributed over the compute nodes, such that each participating compute node computes a floating-point partial result. The partial results then propagate through the network via the network switches, which are configured to sum any partial results that are received, until the final sum of all of the partial results has been computed.

To ensure that the final sum does not depend on the order in which the partial results are summed, the partial results are not summed in the original floating-point notation. Rather, each of the network switches converts each newly-received floating-point number to a derived floating-point representation, typically without any loss of precision. Each newly-received number is then added, in the derived floating-point representation, to the partial sum that has been computed thus far, in a manner that maintains the associativity of the summation, as described in detail below. Following the computation of the final sum, the final sum is converted back to the original floating-point representation, and subsequently, communicated across the network.

Since the sum of the operands does not depend on the order in which the operands are summed, embodiments of the present invention improve the consistency of HPC systems and applications. Moreover, since the summation is typically implemented in hardware on the network switches, the summation may be performed relatively quickly.

Embodiments described herein may be used for any relevant HPC application. For example, embodiments described herein may be used for computing the dot product of a distributed error vector, which is often used to assess whether an iterative algorithm has converged.

System Description

Reference is initially made to FIG. 1, which is a schematic illustration of an HPC network 20, in accordance with some embodiments of the present invention. Network 20 comprises a plurality of nodes, including a plurality of compute nodes 22. Each compute node 22 comprises a computer of any relevant type, comprising at least one compute-node processor 21, along with at least one network interface, such as a network interface controller (NIC) 23. In some embodiments, NIC 23 comprises a NIC processor 29. (NIC processor 29 is typically hardware-based, although, in some embodiments, NIC processor 29 may be configured to run software.) Computational tasks are distributed, in parallel, over compute nodes 22. For each task, each of the participating compute nodes computes a respective partial result, and the partial results are then communicated across the network, via NICs 23, for combining.

Network 20 further comprises one or more network switches that connect the compute nodes to each other. For example, FIG. 1 shows three network switches 24a, 24b, and 24c. The compute nodes and network switches may communicate with each other using Ethernet™, Infiniband™, or any other suitable protocol. Each network switch comprises a plurality of communication interfaces, e.g., ports 27, and a network-switch processor 25. Network-switch processor 25 is typically hardware-based, although, in some embodiments, the network-switch processor may be software-based. (For simplicity, the present description may refer to tasks performed by a particular network-switch processor as being performed by the relevant network switch, without specifying the network-switch processor of the relevant network switch.)

In some cases, at least some of the partial results are represented as floating-point numbers, which must be summed such as to yield the final result. For example, FIG. 1 shows a plurality of J compute nodes passing respective floating point numbers $FL_1$, $FL_2$, ... $FL_J$ to network switch 24a. Network switch 24a receives the floating-point numbers via ports 27, sums the floating point numbers in the derived floating-point notation, as described in detail below, and passes the derived floating-point sum, via ports 27, to network switch 24c. Similarly, a plurality of other compute nodes pass a plurality of other floating point numbers (not explicitly shown) to network switch 24b, and network switch 24b then sums the numbers and passes the derived floating-point sum to network switch 24c. Network switch 24c receives the derived floating-point sums via its ports, and then computes the sum of the received sums, plus any other floating-point numbers received, such as to yield the final result.

A more detailed description of FIG. 1 is now provided. Reference is first made to the inset portion 26 of the figure, which lists the calculations performed by network switch 24a. For simplicity, it is assumed that network switch 24a receives the floating point numbers from the compute nodes in the order of the indices of the numbers, i.e., first $FL_1$ is received, then $FL_2$, etc.

First, upon receiving $FL_1$, network switch 24a converts $FL_1$ to the derived floating-point representation ($FL_1 \rightarrow DFL_1$), as further described below with reference to FIG. 2. Next, upon receiving $FL_2$, network switch 24a similarly converts $FL_2$ to the derived floating-point representation ($FL_2 \rightarrow DFL_2$). Next, network switch 24a sums the two derived floating-point numbers, such as to yield a partial sum $PS_1$ ($DFL_1 + DFL_2 = PS_1$). (The derived floating-point summation is further described below with reference to FIG. 2.) The network switch continues to convert the received floating-point numbers to the derived floating-point representation and add the converted numbers to the partial sum. Finally, the last floating-point number $FL_J$ is received, converted to the derived floating-point notation ($FL_J \rightarrow DFL_J$), and added to the latest partial sum $PS_{J-2}$, to yield a derived floating-point sum $DFLS_1$ of $DFL_1$ through $DFL_J$. $DFLS_1$ is then communicated to network switch 24c.

Similarly, network switch 24b converts its received floating-point numbers (not explicitly shown) to the derived floating-point notation, computes a derived floating-point sum $DFLS_2$ of the derived floating-point numbers, and communicates $DFLS_2$ to network switch 24c.

Reference is now made to the inset portion 28 of the figure, which shows the operations performed by network switch 24c. For simplicity, it is assumed that network switch 24c receives only one floating-point number—$FL_K$—in addition to $DFLS_1$ and $DFLS_2$.

Assuming that $DFLS_1$ and $DFLS_2$ are received prior to $FL_K$, network switch 24c first sums $DFLS_1$ and $DFLS_2$, such as to yield a partial sum PS ($DFLS_1 + DFLS_2 = PS$). Next, $FL_K$ is converted to a derived floating-point number $DFL_K$ ($FL_K \rightarrow DFL_K$), and $DFL_K$ is added to PS, yielding a derived floating-point final sum DFLS ($PS + DFL_K = DFLS$). Finally, DFLS is converted back to floating point, yielding the final result FLS (DFLS→FLS).

Typically, the final result FLS is then communicated to other devices on the network, typically via "multicasting," whereby each device sends the result to each device that fed it an operand. The final result is thus ultimately communicated to all of the compute nodes that participated in the parallel computing task.

In some embodiments, at least some of the conversions from floating point to derived floating point, or vice versa, and/or at least some of the summations of the derived floating-point numbers, are performed by NIC processors 29. Floating-point and/or derived floating-point numbers are received via ports belonging to the NICs (not explicitly shown), and are then passed to NIC processors 29 for processing. In some embodiments, NIC processors 29 use techniques described herein to compute local sums of numbers generated by the compute nodes, and then pass the local sums to the network switches, which compute a global sum of the local sums.

In some embodiments, at least some of the conversions from floating point to derived floating point, or vice versa, and/or at least some of the summations of the derived floating-point numbers, are performed by compute-node processors 21. In such embodiments, compute-node processors 21 are configured to perform the conversion and/or summation techniques described below, e.g., by executing program instructions provided in software. (An example implementation in the C programming language is provided below.)

Typically, compute-node processors 21—and, in some embodiments, network-switch processors 25 and/or NIC processors 29—are programmed digital computing devices, each of which comprises a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

As noted above, the summation technique depicted in FIG. 1 does not unduly increase the memory overhead on network 20. In particular, as described above, each network switch computes successive partial sums "on the fly," and therefore, does not need to first store all of the operands. For example, by the time a third floating-point number $FL_3$ arrives, network switch 24a has no more need to store $FL_1$ and $FL_2$, since the partial sum PS1 has already been computed.

As further noted above, the consumed bandwidth and latency remain low, since, at most, only one number at a time needs to be transmitted across a particular connection.

Notwithstanding the particular network topology shown in FIG. 1, it is noted that the scope of the present disclosure covers any relevant type of network topology, including any number of compute nodes or switches. It is also noted that a further advantage of embodiments of the present invention is the relative ease with which changes to the network topology can be made. For example, when adding or removing a connection to a particular network switch, it is possible to simply reconfigure the network switch to expect a greater or lesser number of operands. Thus, for example, network switch 24a may be reconfigured to expect yet another floating-point number $FL_{J+1}$ from yet another compute node, and hence, not communicate a sum to network switch 24c until $FL_{J+1}$ has been added to $FL_1$ through $FL_J$. Such changes to the topology do not affect the consistency of the results.

The Derived Floating-Point Representation

Figure 2:
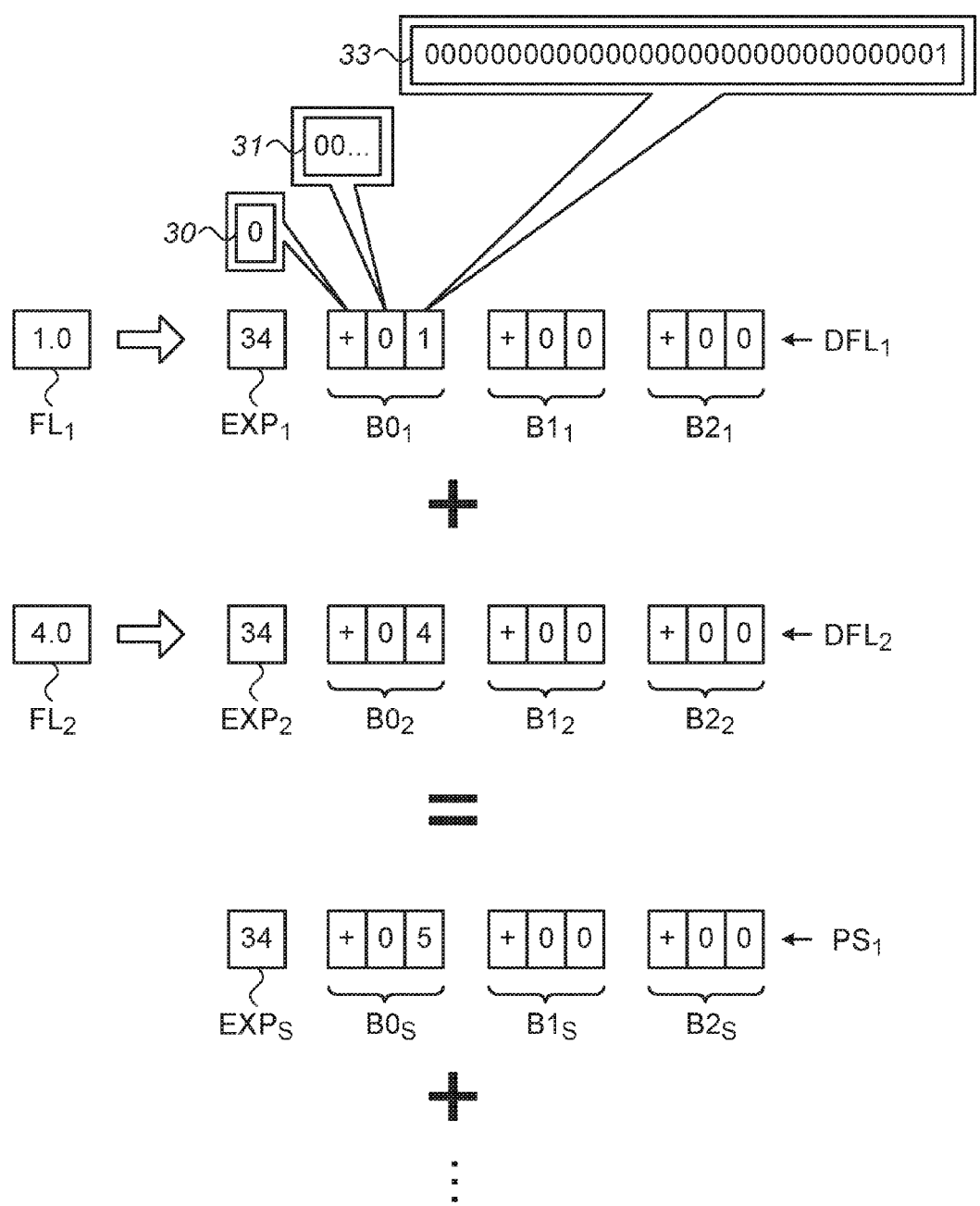
FIG. 2 shows an example application of a method for summing floating-point numbers, in accordance with some embodiments of the present invention.

Reference is now made to FIG. 2, which shows an example application of a method for summing floating-point numbers, in accordance with some embodiments of the present invention. Specifically, FIG. 2 shows a particular derived floating-point representation that is used by the network switches (FIG. 1), and also shows the manner in which the network switches perform the summation of operands in the derived floating-point representation.

For sake of illustration, FIG. 2 shows a simple example, in which $FL_1$ (FIG. 1) is the floating-point number 1.0, and $FL_2$ is the floating-point number 4.0. As described above with reference to FIG. 1, network switch 24a converts these two numbers to respective derived floating-point numbers $DFL_1$ and $DFL_2$, and then sums $DFL_1$ and $DFL_2$ to yield a partial sum $PS_1$. As described above, the network switch then performs further summations, which are not explicitly shown in FIG. 2.

In the below description, it is assumed that each of the floating-point numbers is represented in the IEEE 754 standard 64-bit-precision floating-point representation. It is noted, however, that, mutatis mutandis, techniques described herein may be used to sum numbers that are represented in any suitable floating-point representation.

Typically, the derived floating-point representation includes a plurality of N buckets of bits containing respective signed integer multiplicands that correspond to different respective orders of magnitude. For example, each of the N buckets may store a signed integer multiplicand by storing a sign bit 30, which indicates the sign of the integer, along with a plurality of B magnitude bits 33. In the particular embodiment shown in FIG. 2, (i) N=3, such that there are three buckets B0, B1, and B2, and (ii) B=32, such that each bucket contains a respective signed integer multiplicand whose magnitude is represented by 32 bits.

In other embodiments, instead of storing sign bits, other schemes may be used to store the signed integer multiplicands.

The derived floating-point representation typically further includes an integer indicator EXP that indicates the highest order of magnitude of the buckets. In the particular example shown, the highest order of magnitude, that of the first bucket B0, is $2^{(B \times (EXP-L))}$, where L is generally a function of the respective numbers of bits in the mantissa and exponent of the floating-point notation, as further described below. For example, for the IEEE 754 standard 64-bit-precision floating-point notation, L may be 34, such that, for B=32, B0 corresponds to an order of magnitude of $2^{(32 \times EXP-1088)}$. The next-highest order of magnitude, that of the second bucket B1, is $2^{(B \times (EXP-L-1))}$, which, for the IEEE 754 standard 64-bit-precision floating-point notation, B=32, and L=34, is $2^{(32 \times EXP-1120)}$. The lowest order of magnitude, that of the third bucket B2, is $2^{(B \times (EXP-L-2))}$, which, for the IEEE 754 standard 64-bit-precision floating-point notation, B=32, and L=34, is $2^{(32 \times EXP-1152)}$. (Thus, the orders of magnitude become progressively smaller by a factor of $2^{-B}$.)

For example, for $DFL_1$, $EXP_1$ is 34, such that the order of magnitude of $B0_1$ is 1, that of $B1_1$ is $2^{-32}$, and that of $B2_1$ is $2^{-64}$. Similarly, for $DFL_2$, $EXP_2$ is 34, such that the order of magnitude of $B0_2$ is 1, that of $B1_2$ is $2^{-32}$, and that of $B2_2$ is $2^{-64}$.

The value of each derived floating-point number is the sum of the respective products of the signed integer multiplicands and the corresponding orders of magnitude. For example, the value of $DFL_1$ is $1 \times 1 + 0 \times 2^{-32} + 0 \times 2^{-64} = 1$.

A short theoretical explanation of the derived floating-point representation is now provided. In addition to clarifying certain details in the present description and figures—such as the manner in which the derived floating-point representation is "derived" from the original floating-point representation—the explanation below also demonstrates that the particular embodiment shown in FIG. 2 and described herein may be generalized, e.g., such as to handle any relevant floating-point notation. (For simplicity, the "leading 1" is ignored in the present explanation.)

In general, the total number of magnitude bits needed to represent the full range of floating-point numbers in fixed-point notation, without any loss of precision relative to the floating-point representation, is $2^E + M$, where E is the number of bits in the exponent of the floating-point notation, and M is the number of mantissa bits. For example, for the IEEE 754 standard 64-bit-precision floating-point notation, E=11 and M=52, such that 2100 bits are needed. In practice, however, for any given floating-point number represented in fixed-point notation, only a single, consecutive group of M bits of the 2100 bits will have at least some non-zero values; all other bits of the 2100 bits will be zero.

The $2^E + M$ bits may be divided into a plurality of subsets, each of size B. B is typically chosen, for convenience, to be a power of 2, such as 32, as described above. $2^E + M$ is rounded up to the nearest power of B, B×H, where H is an integer, and then the B×H bits are divided into H subsets, each of size B. For example, for the IEEE 754 standard 64-bit-precision floating-point notation and B=32, H is 66, since 32×66=2112, which is the nearest (greater) power of 32 to 2100. Each subset is assigned a respective order of magnitude, with, typically, the lowest order of magnitude being approximately $2^{-BH/2}$ and the highest order of magnitude being approximately $2^{BH/2}$, successive orders of magnitude differing by a factor of $2^B$. For example, for H=66 and B=32, the lowest order of magnitude may be $2^{-32 \times 34} = 2^{-1088}$, and the highest order of magnitude may be $2^{32 \times 31} = 2^{992}$. (In general, B, H, and the lowest order of magnitude may be set to any suitable values, as long as these values provide for representing the full range of the floating-point notation, and as long as the EXP variable is allotted a sufficient number of bits such as to store H−1, the integer that indicates the highest order of magnitude.)

The integer L, referred to above, is the lowest order-of-magnitude exponent divided by −B. For example, for B=32 and a lowest order of magnitude of $2^{-1088}$, L=(−1088)/(−32)=34.

Since, as described above, only a single, consecutive group of M bits will have at least some non-zero values, any given floating-point number will "occupy," at most, N=ceil((M−1)/B)+1 subsets of bits, where M, as above, is the number of mantissa bits, and the "ceil" function rounds the argument up to the nearest integer. For example, for the IEEE 754 standard 64-bit-precision floating-point notation and B=32, N=ceil((52−1)/32)+1=2+1=3. The derived floating-point representation of FIG. 2 is a slimmed-down, "bucketized" version of the fixed-point notation, whereby the bits from each one of the N subsets "become" the magnitude bits 33 of a respective bucket, the order of magnitude of each bucket being the same as that of the original subset. (By manipulation of the equation N=ceil((M−1)/B)+1, it may be stated that N, the number of buckets, is the smallest integer for which B*(N−1)>=M−1.)

Thus, for any given floating-point representation and choice of B, the number N of buckets needed for the derived floating-point representation is fixed, and is readily computed. Furthermore, for any given number represented in the floating-point representation, the respective orders of magnitude of the buckets (or equivalently, the EXP integer that indicates the orders of magnitude) may be readily computed from the exponent of the floating-point number, and the integer multiplicands may be readily computed from the mantissa (or significand) of the floating-point number, as shown in the C code below. Moreover, the derived floating-point representation has a sufficient number of bits such as to represent any given number that is received in the original floating-point representation without any loss of precision relative to the original floating-point representation.

As described above, each bucket typically includes a sign bit 30. For any given floating-point number, the sign in each of the buckets is the sign of the number. For example, since $FL_1$ is positive, each of buckets $B0_1$, $B1_1$, and $B2_1$ are shown storing the "+" symbol. In practice, the sign of the number is typically computed by raising −1 to the power of sign bit 30, such that "+" corresponds to a sign bit 0, and conversely, "−" corresponds to a sign bit 1. The storage of the sign in each of the buckets facilitates the separate summing of each "order" of buckets, as further described below.

Summing in the Derived Floating-Point Representation

Summing any pair of numbers in the derived floating-point representation comprises separately summing each pair of integer multiplicands that correspond to the same order of magnitude. In other words, each order of buckets is separately summed.

For example, in the simple case shown in FIG. 2, since $EXP_1=EXP_2$, the buckets of $DFL_2$ are already "aligned" with those of $DFL_1$, i.e., $B0_1$ and $B0_2$ have the same order of magnitude (and likewise for $B1_1$ and $B1_2$, and for $B2_1$ and $B2_2$). Thus, for the sum $PS_1$ of $DFL_1$ and $DFL_2$, (i) $B0_1$ (which has a value of 1) is summed with $B0_2$ (which has a value of 4) to yield a bucket $B0_S$ having a value of 5, (ii) $B1_1$ is summed with $B1_2$ to yield a bucket $B1_S$ having a value of 0, and (iii) $B2_1$ is summed with $B2_2$ to yield a bucket $B2_S$ having a value of 0. $EXP_S$ is equal to both $EXP_1$ and $EXP_2$, i.e., $EXP_S=34$.

More generally, if the respective sets of buckets are misaligned with one another (i.e., if the EXP values of the operands are not equal to one another), the buckets are first aligned, prior to performing the summation. In performing the alignment, the EXP of the smaller number is raised to match that of the larger number, and the integer multiplicands of the smaller number are shifted to the right—i.e., shifted to lower-order buckets—by a corresponding number of buckets. The EXP of the sum is thus always the maximum of the two respective EXP values of the operands. (In general, the opposite form of alignment—lowering the EXP value and shifting the integer multiplicands to the left, i.e., to higher-order buckets—is not performed, as such a form of alignment would compromise the associativity of the summation.)

Stated differently, to align the two derived floating-point numbers, the network switch first computes the difference D between the EXP of the larger operand and that of the smaller operand (where D, by definition, is greater than or equal to zero). The network switch then shifts the integer multiplicands of the smaller number by D bucket positions, and subsequently, separately sums each pair of integer multiplicands having the same position.

The alignment procedure is shown below for two simple cases, using the notation (EXP, B0, B1, B2) to represent a number. (Using this notation, for example, $DFL_1$ may be written as (34,1,0,0).)

Case 1—The sum of a first number (20, 2, 3, 4) and a second number (19, 5, 6, 7):

Since the second number has an EXP value that is one lower than the EXP of the first number, the second number must be shifted by one bucket in order to be aligned with the first number. Thus, the second number effectively becomes (20, 0, 5, 6), and the sum is therefore (20, 2+0, 3+5, 4+6)=(20, 2, 8, 10).

Case 2—The sum of a first number (45, 102, 307, 900) and a second number (48, 1, 0, 0):

In this case, the difference between the EXP values is sufficiently large such that the first number is entirely insignificant relative to the second number—i.e., the first number is effectively (48, 0, 0, 0). Hence, the sum of the two numbers is (48, 1, 0, 0).

Typically, the network switch designates a derived floating-point accumulator, which is used to hold the running sum of the numbers. For example, with reference to FIG. 2, upon converting $FL_1$ to $DFL_1$, the memory allocated to $DFL_1$ may be designated as the accumulator. Accordingly, following the first sum operation, the sum of $DFL_1$ and $DFL_2$, $PS_1$, replaces $DFL_1$ in the accumulator. Similarly, following the next sum operation, the accumulator will hold the next partial sum $PS_2$ (not explicitly shown in the figure), and so on.

A challenge arises in cases in which the sum of two integer multiplicands is greater than $2^B-1$, i.e., the sum cannot be stored in only B bits. Generally, carry between buckets is not performed, as such an operation would compromise the associativity of the summation. (In the context of the present application, including the claims, "separately summing" integer multiplicands that correspond to the same order of magnitude includes, by definition, the lack of carry between different orders of magnitude.) To address this challenge, therefore, embodiments of the present invention provide, in each bucket, one or more overflow bits 31. Overflow bits 31 are used to store sums that are greater than $2^B-1$. Typically, the number of overflow bits is ceil(log 2W), wherein W is the expected maximum number of operands. This number allows each bucket to store any number up to $W\times(2^B-1)$, the maximum possible sum of W B-bit integers.

In some embodiments, only the accumulator includes overflow bits 31; the "basic" derived floating-point representation, on the other hand, does not include the overflow bits. Thus, for example, with reference to FIG. 2, and assuming that the memory space holding $DFL_1$ is designated as the accumulator, $DFL_2$ and subsequent derived floating-point numbers do not necessarily include any overflow bits.

Proceeding as shown in, and described with reference to, FIG. 1, the final sum, DFLS, will be a number (EXPMAX, X1, X2, X3), where EXPMAX is the maximum EXP over all of the operands, X1 is the sum, over all of the operands, of all integer multiplicands corresponding to order of magnitude $2^{(B\times(EXPMAX-L))}$ (e.g., $2^{(32\times EXPMAX-1088)}$ for the embodiment mainly described herein), and X2 and X3 are, respectively, the sums over all operands for orders of magnitude $2^{(B\times(EXPMAX-L-1))}$ and $2^{(B\times(EXPMAX-L-2))}$. (As noted above, neither X1, X2, nor X3 includes any carry from sums of lower-order buckets.)

As described above, network switch 24c (the "root node" in the particular network topology shown in FIG. 1) converts this sum back to the floating point representation, by computing the value $2^{(B\times(EXPMAX-L))} \times (X1+X2/2^B+X3/2^{2B})$.

Example Code and Pseudocode (i) C code for converting an IEEE 754 standard 64-bit floating-point number "src" to derived floating point, assuming that B=32 and L=34:

```
void convert(const double src) {
    int EXP;
    long double significand = frexp(src, &EXP);
    EXP += 32*34;
    int mod = EXP%32;
    if (mod==0) mod=32;
    significand *= powl(2.0, mod);
    EXP = (EXP-mod)/32;
    for(int i=0; i<=2; i++) {
        bucket[i] = (long) significand;
        significand -= bucket [i];
        significand *= powl(2.0, 32);
    }
}
```

Table 1 below shows various example calls to the function above, along with the corresponding outputs:

TABLE 1

| Function Call | Output |
| --- | --- |
| convert(2.0L*powl(2, −32)); | EXP = 33, bucket = (2, 0, 0) |
| convert(3.0L+5.0L*powl (2, −32)); | EXP = 34, bucket = (3, 5, 0) |
| /* convert smallest positive number in the IEEE 754 standard */ unsigned long x = 1L; convert(*( (double *) &x)); | EXP = 0, bucket = (16384, 0, 0) |
| /* convert largest positive number in the IEEE 754 standard */ unsigned long x = 0x7fefffffffffffff; convert(*( (double *) &x)); | EXP = 65, bucket = (4294967295, 4294965248, 0) |

It is noted that the algorithm implemented in the code above may be similarly implemented in hardware, mutatis mutandis.

(ii) Pseudocode to sum two numbers op1 and op2, each of which is represented in the derived floating-point notation (EXP, BUCKET[0], BUCKET[1], BUCKET[2]), which may be implemented, for example, in hardware on a network switch:

```
/* make sure that op1 has an equal or higher order of magnitude
than op2 */
If (op1.EXP<op2.EXP) swap(op1, op2)
// Now calculate the difference D between the EXP values
D=op1.EXP-op2.EXP
// Now align the numbers
// If necessary, shift op2.BUCKET one position to the right:
If (D=1) op2.BUCKET[2]=op2.BUCKET[1],
op2.BUCKET[1]=op2.BUCKET[0], op2.BUCKET[0]=0
// If necessary, shift op2.BUCKET two positions to the right:
If (D=2) op2.BUCKET[2]=op2.BUCKET[0], op2.BUCKET[1]=0,
op2.BUCKET[0]=0
// If op2 is too small relative to op1, make it zero:
If (D>2) op2.BUCKET[2]=0, op2.BUCKET[1]=0, op2.BUCKET[0]=0
// Set the EXP of the result
result.EXP = op1.EXP
/* Now calculate the buckets of the result by summing each pair
of integers that are at the same array position */
For i = 0:2
    result.BUCKET[i] = op1.BUCKET[i] + op2.BUCKET[i]
```

It is noted that embodiments of the present invention also provide for handling NaN and INF values.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. Apparatus, comprising:
one or more communication interfaces for communicating over a communication network; and
a processor, configured to:
receive, via the communication interfaces, a first number and a second number, each of which is in a floating-point representation that includes a mantissa including M bits,
convert each of the first number and the second number to a derived floating-point representation that represents any given floating-point number by N signed integers corresponding to different respective orders of magnitude, each of the signed integers including a group of B magnitude bits, N being greater than or equal to (M−1)/B+1,
such that the first number is represented by N first signed integers, which include respective first groups of magnitude bits, and the second number is represented by N second signed integers, which include respective second groups of magnitude bits,
compute a partial sum in the derived floating-point representation, by adding the first groups of magnitude bits to the second groups of magnitude bits, respectively, using N sets of one or more overflow bits to store any sum of a first group and a second group that is greater than $2^B-1$,
subsequently to computing the partial sum, receive, via the communication interfaces, one or more third numbers in the floating-point representation,
convert the one or more third numbers to the derived floating-point representation,
compute a final sum, by adding the one or more third numbers, in the derived floating-point representation, to the partial sum, and
output the final sum.

2. The apparatus according to claim 1, wherein the apparatus is a network switch,
the communication interfaces being ports belonging to the network switch, and
the processor being a processor of the network switch.

3. The apparatus according to claim 1, wherein the apparatus is a network interface controller (NIC),
the communication interfaces being ports belonging to the NIC, and
the processor being a processor of the NIC.

4. The apparatus according to claim 1, wherein the processor is further configured to
convert the final sum from the derived floating-point representation to the floating-point representation, prior to
outputting the final sum.

5. The apparatus according to claim 1, wherein B is a power of two.

6. The apparatus according to claim 1, wherein the communication network includes a High Performance Computing (HPC) network, and wherein the numbers are respective partial results of a parallel computing task performed on the HPC network.

7. The apparatus according to claim 1, wherein the first signed integers correspond to different respective first orders of magnitude, and wherein the processor is configured to convert the second number to the derived floating-point representation by:
representing the second number by N tentative signed integers corresponding to different respective second orders of magnitude,
computing a non-negative difference D between (i) a highest one of the first orders of magnitude, and (ii) a highest one of the second orders of magnitude, and
representing the second number by the N second signed integers, by shifting the tentative signed integers by D positions.

8. The apparatus according to claim 1, wherein N is a smallest integer that is greater than or equal to $(M-1)/B+1$.

9. The apparatus according to claim 1, wherein the processor is configured to iteratively (i) receive a respective one of the third numbers, (ii) convert the respective one of the third numbers to the derived floating-point representation, and (iii) update the partial sum, by adding the respective one of the third numbers, in the derived floating-point representation, to the partial sum.

10. A system, comprising:
a plurality of networked computers; and
at least one network switch, configured to:
receive, from the computers, a first number and a second number, each of which is in a floating-point representation that includes a mantissa including M bits,
convert each of the first number and the second number to a derived floating-point representation that represents any given floating-point number by N signed integers corresponding to different respective orders of magnitude, each of the signed integers including a group of B magnitude bits, N being greater than or equal to $(M-1)/B+1$,
such that the first number is represented by N first signed integers, which include respective first groups of magnitude bits, and the second number is represented by N second signed integers, which include respective second groups of magnitude bits,
compute a partial sum in the derived floating-point representation, by adding the first groups of magnitude bits to the second groups of magnitude bits, respectively, using N sets of one or more overflow bits to store any sum of a first group and a second group that is greater than $2^B-1$,
subsequently to computing the partial sum, receive, from the computers, one or more third numbers in the floating-point representation,
convert the one or more third numbers to the derived floating-point representation,
compute a final sum, by adding the one or more third numbers, in the derived floating-point representation, to the partial sum, and
output the final sum.

11. The system according to claim 10, wherein the network switch is further configured to:
convert the final sum from the derived floating-point representation to the floating-point representation, prior to
outputting the final sum.

12. The system according to claim 10, wherein B is a power of two.

13. The system according to claim 10, wherein the numbers are respective partial results of a parallel computing task performed by the computers.

14. The system according to claim 10, wherein the first signed integers correspond to different respective first orders of magnitude, and wherein the network switch is configured to convert the second number to the derived floating-point representation by:
representing the second number by N tentative signed integers corresponding to different respective second orders of magnitude,
computing a non-negative difference D between (i) a highest one of the first orders of magnitude, and (ii) a highest one of the second orders of magnitude, and
representing the second number by the N second signed integers, by shifting the tentative signed integers by D positions.

15. The system according to claim 10, wherein N is a smallest integer that is greater than or equal to $(M-1)/B+1$.

16. The system according to claim 10, wherein the network switch is configured to iteratively (i) receive a respective one of the third numbers, (ii) convert the respective one of the third numbers to the derived floating-point representation, and (iii) update the partial sum, by adding the respective one of the third numbers, in the derived floating-point representation, to the partial sum.

17. A method, comprising:
receiving by a network switch, over a communication network, a first number and a second number, each of which is in a floating-point representation that includes a mantissa including M bits;
converting each of the first number and the second number to a derived floating-point representation that represents any given floating-point number by N signed integers corresponding to different respective orders of magnitude, each of the signed integers including a group of B magnitude bits, N being greater than or equal to (M−1)/B+1.

such that the first number is represented by N first signed integers, which include respective first groups of magnitude bits, and the second number is represented by N second signed integers, which include respective second groups of magnitude bits;

computing a partial sum in the derived floating-point representation, by adding the first groups of magnitude bits to the second groups of magnitude bits, respectively, using N sets of one or more overflow bits to store any sum of a first group and a second group that is greater than $2^B-1$;

subsequently to computing the partial sum, receiving one or more third numbers in the floating-point representation;

converting the one or more third numbers to the derived floating-point representation;

computing a final sum, by adding the one or more third numbers, in the derived floating-point representation, to the partial sum; and outputting the final sum.

18. The method according to claim 17, comprising iteratively (i) receiving a respective one of the third numbers, (ii) converting the respective one of the third numbers to the derived floating-point representation, and (iii) updating the partial sum, by adding the respective one of the third numbers, in the derived floating-point representation, to the partial sum.

19. The method according to claim 17, wherein the first signed integers correspond to different respective first orders of magnitude, and wherein converting the second number to the derived floating-point representation comprises:

representing the second number by N tentative signed integers corresponding to different respective second orders of magnitude, computing a non-negative difference D between (i) a highest one of the first orders of magnitude, and (ii) a highest one of the second orders of magnitude, and representing the second number by the N second signed integers, by shifting the tentative signed integers by D positions.

20. A computer software product comprising a tangible non-transitory computer-readable medium in which program instructions are stored, which instructions, when read by a processor, cause the processor to:

receive a first number and a second number, each of which is in a floating-point representation that includes a mantissa including M bits, convert each of the first number and the second number to a derived floating-point representation that represents any given floating-point number by N signed integers corresponding to different respective orders of magnitude, each of the signed integers including a group of B magnitude bits, N being greater than or equal to (M−1)/B+1, such that the first number is represented by N first signed integers, which include respective first groups of magnitude bits, and the second number is represented by N second signed integers, which include respective second groups of magnitude bits, compute a partial sum in the derived floating-point representation, by adding the first groups of magnitude bits to the second groups of magnitude bits, respectively, using N sets of one or more overflow bits to store any sum of a first group and a second group that is greater than $2^B-1$, subsequently to computing the partial sum, receive, via the communication interfaces, one or more third numbers in the floating-point representation, convert the one or more third numbers to the derived floating-point representation, compute a final sum, by adding the one or more third numbers, in the derived floating-point representation, to the partial sum, and output the final sum.

* * * * *